3,282,857
PREPARATION OF AQUASOLS OF CRYSTALLINE ZIRCONIA AND/OR HAFNIA
Frederick T. Fitch and Jean G. Smith, Baltimore, Md., assignors to W. R. Grace & Co., Clarksville, Md., a corporation of Connecticut
No Drawing. Filed Dec. 21, 1962, Ser. No. 246,356
The portion of the term of the patent subsequent to Sept. 22, 1981, has been disclaimed
6 Claims. (Cl. 252—313)

This application relates to the composition of and process for preparing zirconia and hafnia aquasols whose particles are aggregates of tetragonal and monoclinic crystallites of zirconium dioxide or hafnium dioxide or mixtures of the two oxides.

Zirconia and hafnia sols obtained by methods of the prior art consist of particles which are amorphous to X-rays. They are generally prepared by autoclaving zirconyl chloride solutions. Such a method is described in U.S. Patent No. 2,984,628. The crystalline particles of our sols impart a measure of stability not found in the amorphous zirconia colloids of the prior art.

Zirconia is a compound which has several uses. In the preparation of high temperature ceramic nuclear elements, for example, zirconia sols may be blended into the matrix powder to increase the mechanical strength of the fixed elements. This increase in strength results from the small particle size and high reactivity of the dispersed zirconia. Zirconium is a low neutron cross-section element and hence the presence of its oxide in fuel elements does not adversely affect the nuclear properties of those elements. Also, because of its low cross-section, zirconia may be used as a diluent in fuel elements, where one is desired. Its presence may, in fact, help somewhat to stabilize the $UO_2$ against oxidation.

Zirconia sols may similarly be used to prepare non-nuclear ceramics of high mechanical strength. The smaller zirconia particles moreover sinter at lower temperatures than conventional ceramic powders.

Zirconia sols are also of value in metal hardening where a certain percentage of zirconia is desired in the final metal. The sols of our invention afford an economical and convenient vehicle for adding zirconia to a salt of the metal which is then precipitated, dried and reduced. The colloidal zirconia lends exceptional hardness to the final metal by virtue of its high degree of dispersion.

Zirconia is also an important dye mordant. Materials which do not take dyes readily may first be coated with zirconia sol, dried and then exposed to the dye. A much-improved uptake of dye is realized.

The zirconia sols which are most easily prepared are composed of extremely small amorphous particles of $ZrO_2$ in the 3 to 7 millimicron size range. This sol retains absorbed ions quite tenaciously and is not particularly stable to pH changes. Exposure to temperatures above about 40° C. leads to increased viscosity and eventually to gelation.

We have found that the sols composed of the 3 to 7 millimicron particles can be converted to a sol which is stable at higher temperatures and over a broader pH range, and which is amenable to electrolyte removal by centrifuging or ion exchange. The sol particles are uniquely crystalline and are made up of well defined tetragonal and monoclinic crystals. The tetragonal crystals have a c:a ratio so near unity as to be almost cubic. The crystallites are very dense; the monoclinic average 13 m$\mu$, while the tetragonal average 10 m$\mu$ on the side. The monoclinic crystals occur in roughly diamond-shaped aggregates up to 100 millimicrons in length: the tetragonal crystals form smaller aggregates which are roughly cubic and are 10 to 20 m$\mu$ on the side.

For purposes of simplicity, we will describe our invention with reference to a zirconia sol. However, the process is equally applicable to the preparation of hafnia sols. According to the invention, the water-white sol of zirconia or hafnia composed of 3 to 7 millimicron amorphous particles is prepared using any suitable technique.

One suitable method of preparing these sols is electrodialysis of an aqueous solution of a basic zirconium or hafnium salt. Broadly, basic zirconium salts can be used in which the anion corresponds to a monobasic acid. Examples of suitable salts include zirconium oxochloride ($ZrOCl_2 \cdot 8H_2O$), also called zirconyl chloride or basic zirconium chloride, and zirconium oxonitrate ($ZrO(NO_3)_2 \cdot 2H_2O$). Alternately, the transparent zirconia sol can be obtained by passing a solution of the basic zirconia salts through an anion exchange resin. The zirconyl solution should be prepared as a 0.05 to 1, preferably as a 0.3 to 0.7, molar solution.

The second step of our process comprises autoclaving the zirconia sol composed of the small 3 to 7 millimicron particles at a suitable pressure and temperature for a period of time sufficient to convert the sol to the crystalline state. Autoclaving is done in conventional equipment. Autoclaving from 1 to about 40 hours at 100 to 200° C. is sufficient to convert the amorphous zirconia sol to the crystalline product sol. The preferred conditions for a sol containing about 3 to 5% solids are about 10 to 24 hours at about 150° C. During the autoclaving, the pH drops and electrical conductivity rises as anion is released by the sol particles to the surrounding medium. The product is an opaque white sol with a viscosity very close to that of water.

The product sol may be deionized by stirring it with a weak anion-exchange resin, such as the commercially available Amberlite IR-45 or Rexyn AG-3 in their hydroxyl form, for example. Sol concentration may then be increased to at least 30% solids by either vacuum evaporation, preferably at 40° C., or by centrifuging and redispersing the residue in a smaller quantity of water.

The zirconia sol treated according to the process of our invention has several advantages. To begin with, it may be concentrated to at least 30% solids while the translucent precursor sol may be prepared at concentrations only to about 10% solids and may not be further concentrated without gelation. Also, the sol of our invention is stable over a broader range of temperature, pH and electrical conductivity. It will withstand temperatures up to about 200° C. while the precursor sol begins to increase in viscosity at about 40° C. It is stable over a pH range of about 0.2 to 9 while the precursor sol gels when pH is raised above about 3.5 At a 5% solids concentration level, our sol is stable to a specific conductance of about $10^{-5}$ mho/cm. while the precursor sol becomes viscous below about $10^{-2}$ mho/cm. These conductivity limits decrease slightly with increasing zirconia concentration.

Particle characteristics of the product sols are determined by electron microscopy through conventional techniques. Crystallite phases are identified from X-ray diffraction patterns of the dispersed solids after centrifuging. The modified Scherrer method as described by Klug and Alexander, "X-Ray Diffraction Procedures," chapter 9, published by John Wiley and Sons, New York (1954) was used to compute crystallite size from line-broadening measurements. Specific conductance was measured with a platinized platinum cell of cell constant 1 and an Industrial Instruments conductivity bridge, Model RC 16 B1.

Sol viscosity N in centipoises was determined by comparing the drain time of 10.00 ml. of sol $t_s$ with that of 10.00 ml. of water $t_w$ in an Ostwald viscometer and multiplying the ratio by the density of the sol $d_s$, such that $$N = \frac{t_s}{t_w} d_s$$

The invention is further illustrated by the following specific but non-limiting examples.

EXAMPLE I

Four liters of a solution of zirconyl chloride in deionized water containing 3% by weight equivalent zirconium oxide was charged into an electrodialysis equipment of the type described in our co-pending application Serial No. 693,511, filed October 31, 1957, now U.S. Patent 3,097,175. The solution is pumped continuously from a heated densificaton vessel through a cooling coil to reduce its temperature to below 35° C., thence through the cathode compartment of the cell to remove chloride ions through the anion permeable membrane, and then back to the densification vessel. The temperature in the densification vessel was maintained at about 92–97° C. during most of the electrodialysis and at 80° C. during the last few hours.

The sol product had a pH of about 3.5, a density of 1.030, a specific conductance of $2.1 \times 10^{-3}$ mhos/cm. and contained 2.93% zirconia. Its viscosity was 3.30 centipoises. Electron micrographs showed the product was composed of small elongated particles with an estimated 3 to 7 millimicron size range.

This example describes the general method of preparing the precursor zirconia sol used in the process of our invention.

EXAMPLE II

A sol prepared by electrodialysis using the method described in Example I was autoclaved to convert it from the amorphous to the crystalline state.

A portion of the sol was transferred to a glass pressure vessel and sealed therein. The vessel was heated for 19 hours at 150° C. without agitation. At the end of this period, the vessel was cooled to room temperature and the product examined. The product was a free-flowing opaque white sol having a pH of 1.25, a specific conductance of $2.6 \times 10^{-2}$ mhos/cm. and a relative viscosity of 1.30. The electron micrographs of the sol showed it was composed of a mixture of cubes 14 to 20 millimicrons on a side and diamond shaped aggregates averaging 35 millimicrons in width and 100 millimicrons in length. X-ray diffraction patterns were obtained for both the tetragonal and monoclinic zirconia particles.

EXAMPLE III

Another zirconia sol composed of the crystalline particles was prepared. In this run, a sample of translucent zirconia sol obtained by electrodialysis of zirconyl chloride according to the process described in Example I was treated hydrothermally. This precursor sol contained 3 grams of zirconia per 100 ml. Its pH was 3.28, its specific conductance $2.9 \times 10^{-3}$ mhos/cm. and its viscosity 3.72 centipoises. The sol sample was sealed in a glass pressure vessel as in Example II and heated for 19 hours at 150° C. The product was a non-viscous opaque white sol having the following properties:

pH _____ 1.18
Specific conductance, mhos/cm. _____ $3.2 \times 10^{-2}$
Viscosity, centipoises _____ 1.24

The product was similar to the product described in Example II except that the electron micrograph showed the cubic particles to be smaller, of the order of 10 millimicrons. Continued autoclaving for a period of 60 hours increased the particle density somewhat, but produced no gross changes in particle structure.

A portion of this sol was deionized by treating it with the weak anion exchange resin, Amberlite IR–45 in the hydroxyl form. After the sol was deionized the specific resistance was $1.1 \times 10^{-4}$ mhos/cm. and the pH was 4.9.

A separate portion of this sol was deionized and concentrated by centrifuging, decanting and redispersing in a smaller quantity of water. The final product was a stable sol that contained about 30 weight percent solids.

EXAMPLE IV

This example describes an alternate method of preparing the sol of our invention.

In this run, the precursor zirconia sol made up of the 3 to 7 millimicron amorphous particles was prepared by passing a zirconyl chloride solution containing the equivalent of 1 gram zirconium oxide per 100 milliliters, through a column packed with the weak anion exchange resin, Amberlite IR–45 in the hydroxyl form. The resulting sol and a pH of 2.68 and a specific conductance of $5.3 \times 10^{-3}$ mhos/cm.

A sample of this transparent zirconia sol was placed in an autoclave using the technique described in Example II. The sol was autoclaved at a temperature of 150° C. for a period of 20 hours. After autoclaving, the pH of the product sol was 1.12, the specific conductance was $3.3 \times 10^{-2}$ mhos/cm. The product was an opaque white sol. Electron micrographs showed it to consist almost entirely of diamond shaped aggregates of 8 millimicron monoclinic crystallites. The aggregates ranged in length from about 15 to 60 millimicrons.

EXAMPLE V

This example describes, for sake of comparison, a sol prepared according to the method of the prior art.

A solution of zirconyl chloride containing the equivalent of 5 grams of zirconia per 100 ml. was placed in an autoclave and heated for 20 hours at 150° C. When cool, the autoclave contained a white residue with a clean supernatant. The supernatant was drawn off by suction. Its pH was 0.41 and its specific conductance 0.17 mhos/cm. The settled solids were dispersed to an opaque white sol by mixing with water.

A few drops of sol were diluted and examined by electron microscopy. By this means, the sol particles were shown to be cubic ranging in size up to 185 m$\mu$. Samples of the dispersed phase for X-ray diffraction were separated from the sol medium by centrifuging. They proved to be amorphous to X-rays as contrasted with the monoclinic and tetragonal diffraction patterns obtained with the sols of our invention.

Obviously many modifications and variations of the invention as hereinabove set forth may be made without departing from the essence and scope thereof, and only such limitations should be applied, as indicated in the appended claims.

What is claimed is:

1. A process for preparing aquasols of crystalline particles of oxides of elements selected from the group consisting of zirconium and hafnium which comprises the steps of:
   (a) preparing an aqueous solution of a basic salt of said element,
   (b) electrodialyzing said salt solution to prepare a sol of amorphous particles in the 3 to 7 millimicron size range,
   (c) heating said sol in a closed vessel at a temperature of 100 to 200° C. for about 1 to 40 hours to insure particle growth and crystallization,
   (d) cooling said sol,
   (e) deionizing, concentrating to 10 to about 30 percent solids and recovering the product sol.

2. The process according to claim 1 wherein the aqueous solution is a 0.05 to 1 molar solution of zirconyl and hafnyl slats.

3. The process according to claim 1 wherein the sol is autoclaved at a temperature of 120 to 180° C. for a period of 2 to 24 hours.

4. The process according to claim 1 wherein the sol is deionized by contact with an anion exchange resin.

5. The process according to claim 1, wherein the sol is deionized by contact with an anion exchange resin and concentrated by centrifugation, particle separation and redispersion of the residue.

6. The process according to claim 1 wherein the solution is a 0.4 molar zirconyl chloride solution, the heating is carried out in an autoclave at a temperature of 150° C. for a period of 20 hours and the concentration is carried out by centrifugation, particle separation and redispersion of the residue.

References Cited by the Examiner

UNITED STATES PATENTS

| | | | |
|---|---|---|---|
| 2,984,628 | 5/1961 | Alexander et al. | 252—313 |
| 3,110,681 | 11/1963 | Meadows et al. | 252—313 |
| 3,150,100 | 9/1964 | Fitch et al. | 252—313 X |

LEON D. ROSDOL, *Primary Examiner.*

JULIUS GREENWALD, ALBERT T. MEYERS,
*Examiners.*

R. D. LOVERING, *Assistant Examiner.*